E. E. EINFELDT.
WHEEL CONSTRUCTION.
APPLICATION FILED NOV. 13, 1915.
1,249,356.
Patented Dec. 11, 1917
2 SHEETS—SHEET 1.
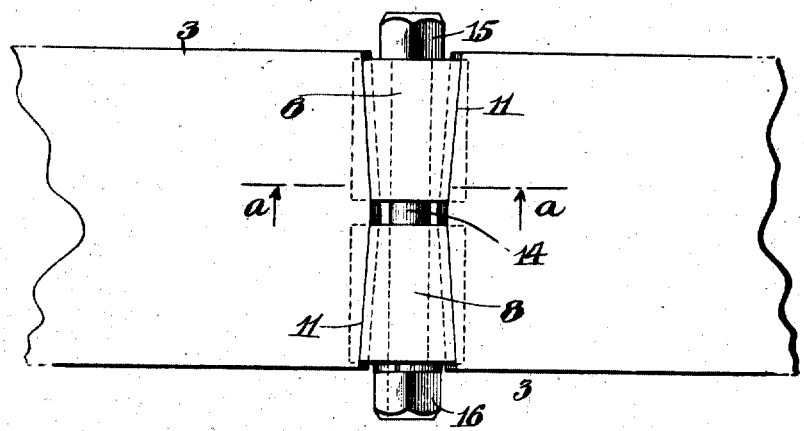
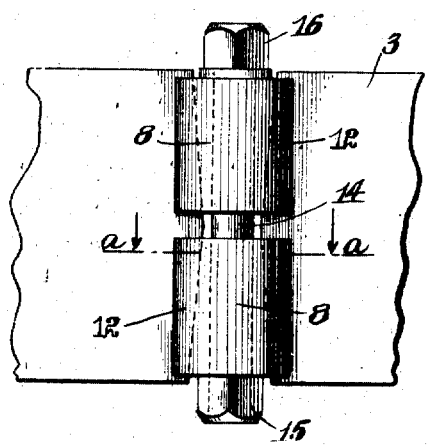
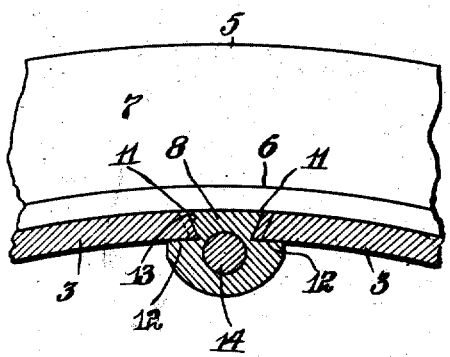
Inventor:
E. E. Einfeldt
by Rogers, Kennedy & Campbell
Attys

E. E. EINFELDT.
WHEEL CONSTRUCTION.
APPLICATION FILED NOV. 13, 1915.

1,249,356.

Patented Dec. 11, 1917.
2 SHEETS—SHEET 2.

Inventor:
E. E. Einfeldt
by Rogers, Kennedy & Campbell
Attys

UNITED STATES PATENT OFFICE.

ERNEST E. EINFELDT, OF DAVENPORT, IOWA, ASSIGNOR TO G. WATSON FRENCH, NATHANIEL FRENCH, AND JOSEPH L. HECHT, ALL OF DAVENPORT, IOWA, COMPOSING THE FIRM OF FRENCH & HECHT, OF DAVENPORT, IOWA.

WHEEL CONSTRUCTION.

1,249,356.  Specification of Letters Patent.  Patented Dec. 11, 1917.

Application filed November 13, 1915.  Serial No. 61,282.

*To all whom it may concern:*

Be it known that I, ERNEST E. EINFELDT, a citizen of the United States, residing at Davenport, in the county of Scott and State of Iowa, have invented certain new and useful Improvements in Wheel Construction, of which the following is a specification, reference being had therein to the accompanying drawing.

This invention relates to vehicle wheels and has reference more particularly to an improved construction of wheel to facilitate the attachment of a rubber tire thereto.

In modern motor trucks, the wheels are commonly equipped with solid rubber tires, consisting usually of a steel tire ring and a firmly attached solid rubber tire proper. The tire ring must be fastened to the wheel with great firmness, and it is customary in applying the same, to force the tire ring under powerful pressure, over the wheel rim in the case of a metal wheel, or in the case of a wooden wheel, over the steel band which surrounds the felly. This operation is objectionable because of the necessity of forming the parts of accurate dimensions to secure their proper and close fit, and also because there is required a special equipment for subjecting the tire ring to the great pressure required.

My invention aims to overcome these objections, and it consists in splitting the rim of the wheel and in applying between the split ends, an expanding wedge or wedges, the said parts being so relatively formed in the improved manner to be more fully described hereinafter, that the rim, after the application of the tire ring thereto by hand, may be expanded within the tire ring and the parts firmly connected together in operative relations.

In the accompanying drawings I have shown my invention embodied in an all metal wheel, the expanding wedges operating between the split ends of the metal wheel rim, but it will be manifest that the invention is not limited to this particular type of wheel, but may be applied to wooden wheels, and wheels of other forms and constructions, without departing from the limits of the invention. Further it will be understood that the invention is not limited to any particular form or construction of the parts except in so far as such limitations are specified in the claims.

In the accompanying drawings:

Figure 1 is a plan view of a portion of a wheel having my invention embodied therein, the tire ring with its rubber tire being omitted.

Fig. 2 is an inside face view of the same.

Fig. 3 is a section on an enlarged scale on the line *a—a* of the preceding figures.

Figure 4:
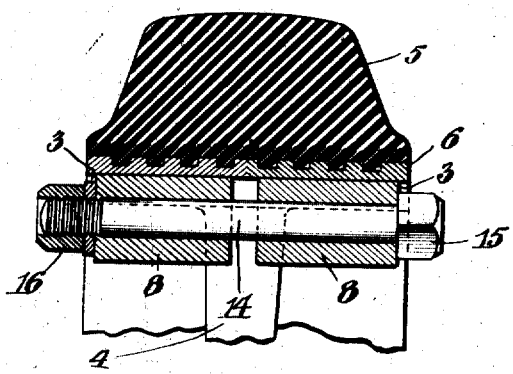
Fig. 4 is a section taken axially of the wheel through the expanding wedges and adjacent parts of the wheel.
Figure 5:
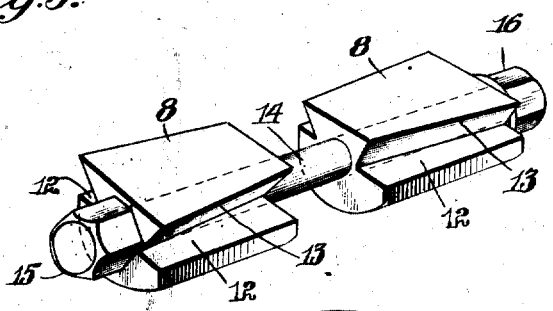
Fig. 5 is a perspective view of the expanding wedges detached from the wheel rim.
Figure 6:
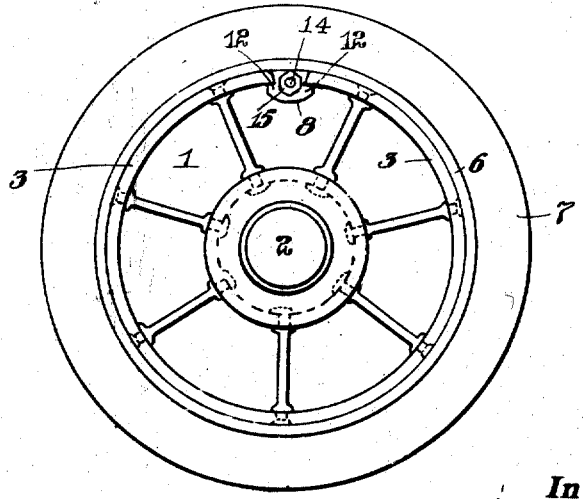

Referring to the drawings:

1 represents a metal wheel consisting of the hub 2, rim 3 and the spokes 4 connecting said parts. 5 represents a solid rubber tire applied to a tire ring 6, usually of steel, the rubber being preferably embedded in recesses in the outer face of the ring to enable the rubber tire to be built up thereon, and to effect a firm and fixed attachment of the rubber to the ring.

In accordance with my invention, the rim 3 is split at a point between adjacent spokes, and the split ends of the rim are formed with sloping surfaces, between which are disposed expanding wedges 8, 8. These wedges are provided on opposite sides with surfaces adapted to coöperate with the sloping surfaces of the rim ends in such manner that when the wedges are drawn together by suitable means, the ends of the rim will be spread apart and the rim as a whole expanded. To adapt the parts to coöperate with each other in this manner, and in order to prevent the expanding wedges from being displaced radially, the ends of the rim are inclined in opposite directions from each other from the center of the rim toward its side edges, thereby forming on each end, two surfaces 11 sloping outwardly in a direction axially of the wheel. The opposite surfaces 11 also slope inwardly toward each other in a radial direction as shown in Fig. 3. The expanding wedges are provided with surfaces 13 which slope in an axial direction inwardly toward each other from their outer ends so as to coöperate with the surfaces 11 of the rim ends, and also slope inwardly toward each other in a radial direction to coöperate with the inward slope of the surfaces 11. As a result of this relation of the several surfaces, when the expanding wedges are seated end to end between the ends of the rim as shown in Fig. 1, they will be prevented from being displaced inwardly with reference to the ends of the rim, and in order to prevent their displacement in the opposite direction, that is outwardly, the wedges are provided on opposite sides with shoulders 12 which, as shown in Fig. 3, bear against the inner side of the rim adjacent the ends thereof. It is seen therefore that by the provision of the shoulders 12 and the inwardly sloping surfaces on the wedges, the latter are guided in their axial movements between the ends of the rim and are prevented from being displaced radially in either direction.

The wedges are provided with alined openings through which a bolt 14 extends, a head 15 on one end of the bolt bearing against the outer end of one of the wedges, and a nut 16 on the opposite end of the bolt bearing against the outer end of the other wedge, so that by screwing up the nut, the wedges may be drawn toward each other, which action, due to the coöperation of the sloping surfaces on the wedges and rim ends, will separate the latter and effect the general expansion of the rim as a whole.

In applying the rubber tire to a wheel constructed in the manner described, the wedges are loosened up so as to permit the ends of the rim to approach each other. The tire ring with the rubber tire attached, is then passed over the contracted rim, whereupon the nut is screwed up to draw the wedges together, with the result that the rim will be expanded and caused to seat tightly and firmly and with great force within the surrounding tire ring.

It is seen, therefore, that by reason of the construction of the rim so that it may be expanded in the manner described, the tire ring may be applied and firmly attached with facility and expedition, and wholly by hand, thereby avoiding the expense of the special equipment which has heretofore been required in forcing the tire ring over a closed rim, and avoiding also the expensive operations of accurately forming the parts for close fitting.

Having thus described my invention, what I claim is:

1. In a wheel, the combination of a split rim, the ends of which are provided with surfaces sloping inwardly toward each other in a radial direction, an axially movable expanding wedge provided with sloping side edges seated between the sloping surfaces of the rim ends, said wedge being provided with shoulders bearing against the inner face of the rim, and means for moving the wedge axially to expand the rim within a surrounding tire ring.

2. In a wheel, the combination of a split rim provided on its ends with surfaces sloping inwardly toward each other in a radial direction, and sloping in opposite directions from the center of the rim toward its edges, two axially movable expanding wedges seated between the ends of the rim and provided with sloping side edges corresponding to the sloping surfaces of the rim ends, and means for moving said wedges axially in opposite directions to expand the rim within a surrounding tire ring.

3. In a wheel, the combination of a split rim, the ends of which incline from the center of the wheel outwardly from each other in opposite directions toward the edges of the rim, and which inclined ends slope inwardly in a radial direction toward each other, two expanding wedges disposed end to end between the ends of the rim and having sloping surfaces coöperating with those on the rim ends, said wedges being provided also with shoulders adapted to bear against the inner side of the rim, and a bolt connecting said wedges and adapted to draw them together to expand the rim within a surrounding tire ring.

In testimony whereof, I have affixed my signature.

ERNEST E. EINFELDT.